Patented July 29, 1941

2,250,660

UNITED STATES PATENT OFFICE 2,250,660

DERIVATIVES OF HYDROXY - AZA - COMPOUNDS AND PROCESS OF PREPARING SAME

Fritz Straub, Kaiseraugst, and Emil Mannhart, Basel, Switzerland, assignors to the firm of Society of Chemical Industry in Basle, Basel, Switzerland No Drawing. Application July 18, 1939, Serial No. 285,175. In Switzerland July 27, 1938

4 Claims. (Cl. 260—289)

According to this invention new derivatives of hydroxy-aza-compounds are made by causing an hydroxy-aza-compound to react with an aldehyde, and if desired, acting on the resulting product with an agent which effects substitution.

The hydroxy-aza-compounds used as starting materials in the invention preferably contain two or more rings united together, which for example may be 6-membered rings, and contain advantageously at least one hydroxyl-group in a ring other than that which contains the aza-nitrogen atom, and may be further substituted in any manner, for example, substituted by halogen; it is of advantage that at least one of the substitution positions activated by the hydroxyl group, for example the ortho- or para-position, should be occupied by hydrogen. Suitable compounds of this kind are for example hydroxy-quinoline, such as, for example 8-hydroxy-quinoline, hydroxy-aza-phenanthrenes, hydroxy-aza-anthracenes, hydroxy-diaza-chrysenes, which may contain other substituents.

There are suitable for the reaction, for example, aliphatic aldehydes of low molecular weight, such as formaldehyde and acetaldehyde. Instead of using aldehydes in the free state there may be used if desired polymerisation products thereof or other substances which yield aldehyde, when under the conditions of the reaction with the hydroxy-aza-compounds aldehyde is produced therefrom.

The reaction between the aldehyde and the hydroxy-aza-compound may be conducted under very various conditions, if desired at room temperature or at higher or lower temperature, for example in an aqueous medium. It is of particular advantage to work in the presence of compounds of acid character, for example free acids. Of advantage for example are hydrohalic acids, which if desired may be used in high concentration, and if desired catalysts may also be used.

The constitution of the products obtained by the invention has not yet been established. They are valuable intermediate products for the manufacture of dyestuffs and pharmaceutical products.

The following example illustrates the invention, the parts being by weight:

146 parts of 8-hydroxy-quinoline are dissolved in 350 parts of hydrochloric acid of 30 per cent strength. If necessary the solution is filtered from impurities and saturated with hydrochloric acid gas at 20° C. 100 parts of a solution of formaldehyde of 36 per cent strength are then added and further hydrochloric acid gas is introduced to produce saturation. After a few hours the new hydroxy-quinoline derivative begins to crystallize out. The reaction mixture is then allowed to stand for 2-3 days under a slight excess pressure of hydrogen chloride, then filtered with suction, pressed as well as possible and dried at 70° C.

The resulting product is a light yellow powder. At 190° C. it distinctly changes color to brown, upon further heating to about 240° C. it partially sublimes, and is black at 290° C. Upon dissolution in water it decomposes, splitting off hydrochloric acid.

A very similar product is obtained when using hydrogen bromide instead of hydrogen chloride.

What we claim is:

1. Process for the manufacture of derivatives of hydroxy-aza-compounds, comprising reacting 8-hydroxy-quinoline with a substantially equimolecular amount of formaldehyde in presence of concentrated hydrogen halide.

2. Products identical with those obtained by reacting 8-hydroxy-quinoline with a substantially equimolecular amount of formaldehyde in presence of concentrated hydrogen halide.

3. Process for the manufacture of derivatives of hydroxyaza-compounds, comprising reacting 8-hydroxy-quinoline with a substantially equimolecular amount of formaldehyde in the presence of concentrated hydrogen chloride.

4. The product identical with that obtained by reacting 8-hydroxyquinoline with a substantially equimolecular amount of formaldehyde in presence of concentrated hydrogen chloride.

FRITZ STRAUB.
EMIL MANNHART.